United States Patent
Ogrin et al.

(10) Patent No.: US 7,825,812 B2
(45) Date of Patent: Nov. 2, 2010

(54) SYSTEM AND METHOD FOR HAND HYGIENE COMPLIANCE MANAGEMENT AND HORIZONTAL PUMP DISPENSER THEREFOR

(76) Inventors: Kirk Ogrin, 214 Fern La., Big Fork, MT (US) 59911; Rodney F. Ogrin, 519 Cascade Ave., Big Fork, MT (US) 59911; Ron Cagle, 96 N. Evergreen Dr., Ventura, CA (US) 93003; Jose Ruiz, 3345 Ketch Ave., Oxnard, CA (US) 93035

( * ) Notice: Subject to any disclaimer, the term of this patent is extended or adjusted under 35 U.S.C. 154(b) by 883 days.

(21) Appl. No.: 11/724,090

(22) Filed: Mar. 13, 2007

(65) Prior Publication Data
US 2007/0229288 A1 Oct. 4, 2007

Related U.S. Application Data

(60) Provisional application No. 60/783,315, filed on Mar. 16, 2006, provisional application No. 60/812,422, filed on Jun. 10, 2006, provisional application No. 60/898,345, filed on Jan. 29, 2007.

(51) Int. Cl.
*G08B 23/00* (2006.01)
(52) U.S. Cl. .................. 340/573.1; 222/82; 222/175; 340/539.11; 340/539.29
(58) Field of Classification Search . 340/539.1–539.29, 340/573.1, 286.07; 705/7; 222/82, 175, 222/39; 134/57 R, 113; 141/18
See application file for complete search history.

(56) References Cited
U.S. PATENT DOCUMENTS

| | | | |
|---|---|---|---|
| 4,121,736 A | 10/1978 | McGaw, Jr. | |
| 5,202,666 A | 4/1993 | Knippscheer | |
| 5,683,012 A | 11/1997 | Villaveces | |
| 5,793,653 A | 8/1998 | Segal | |
| 5,810,201 A | 9/1998 | Besse et al. | |
| 5,812,059 A | 9/1998 | Shaw et al. | |
| 5,819,986 A | 10/1998 | Last et al. | |
| 5,927,548 A | 7/1999 | Villaveces | |
| 5,945,910 A | 8/1999 | Gorra | |
| 5,954,069 A | 9/1999 | Foster | |
| 6,236,953 B1 | 5/2001 | Segal | |
| 6,392,546 B1 | 5/2002 | Smith | |
| 6,426,701 B1 | 7/2002 | Levy et al. | |
| 6,882,278 B2 | 4/2005 | Winings et al. | |
| 6,883,563 B2 | 4/2005 | Smith | |
| 2002/0150198 A1* | 10/2002 | Thompson et al. ............ 377/13 |
| 2004/0150527 A1 | 8/2004 | Harper et al. | |
| 2005/0248461 A1 | 11/2005 | Lane et al. | |
| 2006/0071799 A1 | 4/2006 | Verdiramo | |

* cited by examiner

*Primary Examiner*—Brent Swarthout
(74) *Attorney, Agent, or Firm*—Sandy Lipkin

(57) ABSTRACT

Systems and methods for hand hygiene compliance management include a hand-held personal liquid dispenser including a pump and pump plunger that dispenses liquid from a reservoir inside the dispenser when depressed. The dispenser includes circuitry that detects and records each depression of the plunger, and a port for connection to an external computer to transfer data such as identifiers for the dispenser and its user, and time and date of dispenser usage. A compliance system includes scheduling, training and education in the use of such dispensers, and data collection to track compliance with desired dispenser usage standards. The system may include receivers, transmitters and transceivers to detect and record hand hygiene opportunities, as in patient-occupied areas in a hospital, and transmit personal dispenser usage and other data to a computer.

1 Claim, 7 Drawing Sheets

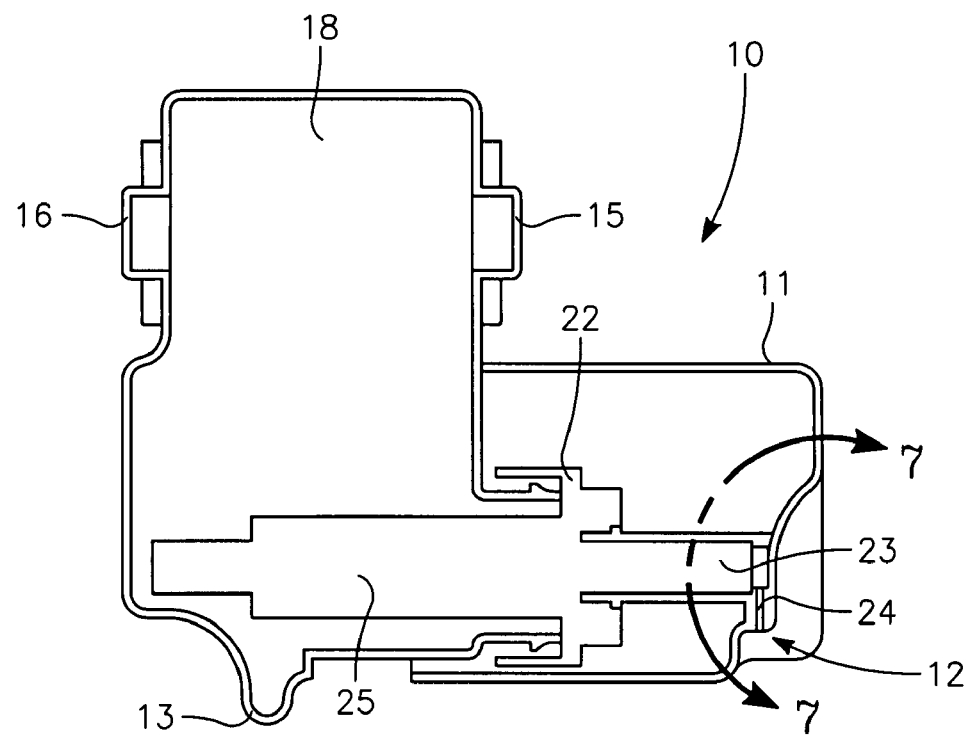
FIG. 5
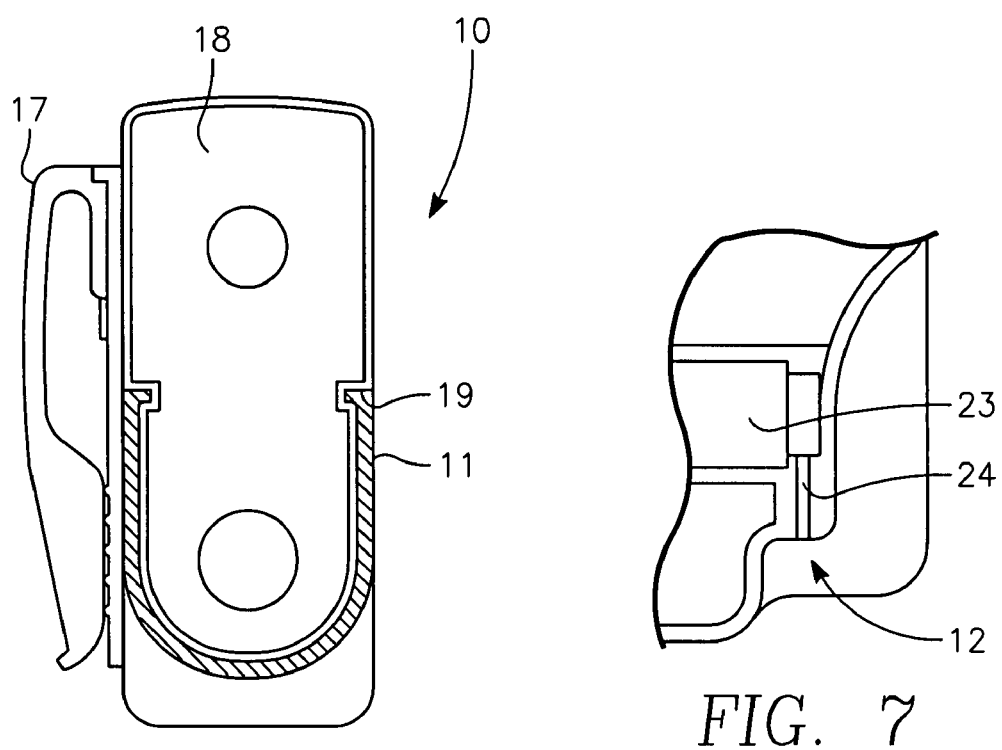
FIG. 6
FIG. 7

SYSTEM AND METHOD FOR HAND HYGIENE COMPLIANCE MANAGEMENT AND HORIZONTAL PUMP DISPENSER THEREFOR

REFERENCE TO PRIOR APPLICATION

This application claims the priority of provisional application 60/783,315, filed Mar. 16, 2006 entitled HORIZONTAL PUMP PERSONAL DISPENSER by Kirk V. Ogrin, Ronald C. Cagle and Jose Ruiz; the priority of provisional application 60/812,422, filed Jun. 10, 2006 entitled SYSTEMS AND METHODS FOR HAND HYGIENE COMPLIANCE MANAGEMENT by Ronald C. Cagle, Rodney F. Ogrin and Jose Ruiz; and the priority of provisional application 60/898,345, filed Jan. 29, 2007 entitled SYSTEMS AND METHODS FOR HAND HYGIENE COMPLIANCE MANAGEMENT—PART 2 by Kirk Ogrin, Ron Cagle and Jose Ruiz.

BACKGROUND OF THE INVENTION

1. Field of the Invention

The present invention relates both to a product for dispensing fluids from a personal dispenser that includes a horizontally-disposed or an angularly-disposed pump inside the dispenser and to a system and method to implement and maintain a comprehensive, multidiscipline, multimodal hand hygiene compliance management program that utilizes the personal dispenser. The dispenser includes a container to hold fluids such as sanitizing fluids, and may include a finger hold, and a slidable pump cover or cap to engage the palm of a human hand, to depress the plunger of the pump, and to cause delivery of such fluids form the dispenser into that palm. In some embodiments, these systems and methods are based on the use of the dispenser along with tracking electronics that record usage data that may be downloaded/transferred into a computer and, optionally, a promotional program. These systems and methods enable an infection control practitioner (ICP) or any other user with an organizational tool for implementing and managing a hand hygiene program, and for training and tracking compliance.

2. Description of the Prior Art

Hand-held dispensers are in widespread use for delivery of personal care products of many kinds, but none includes a horizontally-disposed or angularly-disposed pump for any purpose. A need for such a dispenser exists for the delivery of fluids such as sanitizing fluids onto areas such as the palm of the human hand. Furthermore, there are systems that are designed to ensure compliance with hygiene programs, but none that utilize the single-hand use, body worn dispenser.

Some hand-held devices include U.S. Pat. No. 4,121,736 to McGraw, Jr.; U.S. Pat. No. 5,683,012 to Villaveces; U.S. Pat. No. 5,819,986 to Last et al.; U.S. Pat. No. 5,927,548 to Villaveces; U.S. Pat. No. 5,945,910 to Gorra; U.S. Pat. No. 5,954,069 to Foster; U.S. Pat. No. 6,426,701 to Levy et al.; and U.S. Pat. No, 6,882,278 to Winings et al.

Similar devices also include transmission means to monitor compliance at a remote location. See U.S. Pat. No. 5,812,059 to Shaw et al., U.S. Pat No. 6,236,953 to Segal, U.S. Pat. No. 6,392,546 to Smith, U.S. Pat. No. 6,883,563 to Smith and US application 2004/01050527 to Harper et al.

Systems that seek to solve the problem are disclosed in U.S. Pat. No. 5,202,666 to Knippscheer; U.S. Pat. No. 5,793,653 to Segal, U.S. Pat. No. 5,810,201 to Beese et al and US applications 2005/0248461 to Lane et al. and 2006/0071799 to Verdiramo.

The prior art seeks to solve some of the same problems as the instant invention, but in piecemeal fashion and to not as thorough an effect. The present invention involves a body-worn, single-hand use dispenser of sanitizers that includes electronics that allow tracking of the use through RF, IR or wireless means to a remote computer that generates reports, encourages compliance and provides remedial action to those who are non-compliant as well as rewards to those who are compliant.

SUMMARY OF THE INVENTION

The dispensers of this invention are of a size and shape for personal use, and for delivery onto the palm of a human hand, of fluids such as sanitizers. These dispensers include an internal pump, horizontally or angularly disposed inside the dispenser, and a container for holding fluids to be delivered by the dispenser. The dispenser also includes a slidable cover or cap that includes an indentation that afits over the end of the plunger for the pump. The indentation includes an opening for delivery of fluid from the dispenser. In use, a user pushes against the cap, sliding the cap against, and depressing the plunger of the pump to deliver fluid from the dispenser. In preferred embodiments, the dispenser includes a clip, preferably a detachable clip, on its external surface, for attaching the dispenser to the clothing of a user.

Such dispensers may also include, in preferred embodiments, an internally-positioned data acquisition circuit, e.g., a printed circuit board or a computer chip. The board or chip is linked to the pump plunger so that each time the plunger is depressed, a switch such as a microswitch closes, and the board or chip records the date and time of the event. The board or chip includes a port for connection to an external computer to permit transfer of data, e.g., the user's name or other unique identifier, a dispenser identifier, and usage data, from the internal board or chip to the external computer. Communications with an external computer can also be achieved with radio or other wireless technologies. Some dispenser embodiments may position the board or chip inside the cover of the dispenser, with the port in the cover as well.

These systems and methods of the instant invention schedule each health care worker (HCW) or other participant for education/training, including periodic electronic tracking, and help to manage who gets dispensers with the tracking circuits, and the downloading of data from the dispenser. Scores are maintained. An audio behavior modification training circuit inside at least some of the dispensers prompts use with an audible reminder cue, e.g., the sound "pssss," as part of hand hygiene and compliance.

These systems and methods identify HCWs whose hand hygiene electronic tracking data falls outside desired usage standards. For repeated lack of adherence to desired usage standards, training reinforcement may include verbal review, retraining and administrative sanctions. These systems and methods also generate usage reports for managers and auditors. Adherence and noncompliance usage thresholds are defined and compared against HCW usage data. Adherence/non-adherence data is delivered to rewards and/or to a re-training/usage reinforcement program. Thresholds, rewards, and remedial measures may be defined. Audits are simplified with the documentation these methods and systems provide.

These systems and methods may include record keeping and scheduling, e.g., scheduling of committee meetings, documenting processes, and managing information dissemination. The system maintains an inventory of dispensers and a database of locations/venues. The scheduler generates instructions and lists for promotional material distribution.

Compliance management systems and methods synthesize the key components of an enterprise-wide (e.g., a hospital), comprehensive, multidiscipline, multimodal hygiene program as called for by CDC October 2002 hand hygiene guidelines. Every HCW is tracked through education, training and ongoing spot checks. Training may include computer training, in-service classroom sessions, and hands-on sessions. These systems and methods simplify scheduling and coordination of dispenser usage and education/training.

A circuit is built into each personal dispenser. Every time a dispenser is used, a microswitch is closed and a microcontroller logs usage date and time data. Each dispenser is checked out and assigned to a user running the PC software and plugging in the dispenser. Later, the dispenser is plugged back in as prompted by the software and the data from the dispenser is downloaded into an MS-Access database. Using MS-Access, reports may be generated to view and extract data, and to prepare more detailed or summary reports for export other use.

Personal dispensers for use in these systems and methods have a tracking circuit that can pass personal usage compliance data into an external computer. The data is used for feedback during a training, for ongoing performance evaluation, and for periodic reviews. The electronic tracking system provides a real-time usage data collection and reporting system. The system provides tracking of multiple personal, single-hand, body-worn hand sanitizer dispensers and includes a system to report on usage by user, time, date and other parameters. Systems can include a cable; a printer, and a data CD burner. Reports may include a header record, dispenser records, and time/date records generated each time a dispenser is used.

An audio trainer circuit is built into the dispenser. The circuit provides an audio reminder or cue for users to prompt desired regular dispenser use. A user undergoes a training period, e.g., 1 to 14 days, to make the use of the personal dispenser a habit. Most users temporarily use the audio training circuit to prompt them to the new behavior ("pssss" sound). The personal dispenser then becomes the user's primary hand sanitation device when hands are not visibly soiled.

Radio frequency (RF) or infrared (IR) technology may be used to transfer usage or hand hygiene opportunity data (time stamp sequential records) from either a personal, single-hand, body-worn hand sanitizer dispenser or another unit to a computer. For example, such a computer and an RF or IR receiver may be placed in a frequented area of a facility, e.g., main entrance, employee entrance, or cafeteria. When a personal dispenser with a trainer circuit enters such an area, the data transfer is initiated, successful transfer verified, and the trainer circuit is reset for further data collection. The trainer circuit may be aboard a dispenser or connected, by hard wires or wirelessly, to another unit to be carried by an HCW. Before a dispenser is placed into service, it is initialized by the computer, including the assignment of a unit ID, to a user. Any downloaded data is then associated with the appropriate user's record. Reports from the computer can be generated to lists and to notify any users who have failed to download their dispenser data.

There is also a need to detect electronically when HCWs enter and/or exit patient care zones so that an audible reminder cue to sanitize hands can be made. The system may also detect when a worker enters a patient zone or other hand hygiene opportunity zone, and then record opportunity time/date data for later collection, and/or may generate an audible or visual cue to sanitize one's hands. Radio or RFID technology may be used. Transceivers, receivers, and transmitters all can be used either on/near the patient or on/near a worker. For example, an active patient RFID tag may be connected to a patient bed or installed near a patient room. An RFID receiver may also be in the sanitizer dispenser or another enclosure carried by an HCW. When an HCW's receiver detects an RFID tag, it may generate an audible/visible cue to sanitize hands and/or record a time/date stamp record for transfer to a computer. A passive RFID tag may also be used.

Another method places an RFID tag on an HCW an a receiver in a patient care zone. Time/date stamp data may be collected using direct wire connection, infrared wireless, or radio wireless technologies.

Examples of detecting an HCW or other worker entering a patient care zone for electronic tracking of hand hygiene opportunities and for generating an audible/visible reminder are: 1) a radio transmitter may be placed on or near a patient and a radio receiver may be carried by an HCW or other worker, 2) a radio receiver may be placed on or near a patient and a radio transmitter may be carried by an HCW or other worker, or 3) a radio transceiver may be placed on/near patient and a radio transceiver may be placed on an HCW. The radio transmitter may be an active or passive RFID tag. The transmitter or receiver may also be a transceiver. All receivers, transmitters, and transceivers may be placed in a personal hand sanitizer dispenser, in a wall mounted hand sanitizer dispenser, or in another enclosure to be clipped or otherwise linked to a person, object, or surface.

In the example of a radio transmitter placed on or near a patient with a radio receiver linked to an HCW, an active RFID tag may be placed on a patient's bed. When an HCW enters a room carrying on RFID receiver, mounted in a personal hand sanitizer dispenser or in another unit, the receiver detects and reads the ID of the tag when the HCW is within range of the tag. The HCW receiver device may optionally emit an audible or visual reminder to the HCW to sanitize. The tag and the time/date are then recorded by a receiver circuit, e.g., a microprocessor with memory. The data stored in the HCW receiver device may be then transferred to a computer via a wire connection or wirelessly.

In an example of a radio receiver placed on or near a patient with a radio transmitter carried by an HCW, an active RFID tag may be placed inside a personal hand hygiene dispenser worn by an HCW. An RFID receiver may be placed on or near a patient's bed. When the HCW comes within range of the patient bed, the RFID receiver reads the HCW's tag and uses its microprocessor to record the ID and the time/date stamp. These records may then be transferred to a computer, e.g., an acquisition computer such as a handheld computer, through a direct connect wire, e.g., a serial connection via a USB converter cable, or wirelessly, e.g., by radio communication.

In the example of a radio transceiver placed on/near a patient and a radio transceiver carried by an HCW, a transceiver may be placed inside an HCW's personal hand sanitizer dispenser or in a separate unit the HCW carries, e.g., on a belt or attached to clothing. A patient or a patient's bed has a transceiver placed near to the patient or the patient's bed, e.g., enclosed in a small button attached to a patient, or in an enclosure attached to the bed. The patient transceiver emits a periodic signal, e.g., every 0.1 seconds. When an HCW enters a patient zone, the HCW's transceiver detects this signal from the patient's transceiver. A signal is then sent from the HCW device to the patient's device to acknowledge receipt of this signal. Both an HCW and a patient device may emit an audio and/or visual reminder for the HCW to sanitize his/her hands, and for the patient to remind the HCW to sanitize his/her hands. The HCW will also know that the patient has been cued, reinforcing the reminder. The HCW unit may then log to the patient device ID and store it as a time/date stamp record for transfer to a computer or other storage device.

A personal sanitizer wireless data transfer allows data collection of hand hygiene compliance and hand hygiene opportunity data with minimal effort from HCWs and their administrators. The capability of detecting an HCW entering a patient care zone provides opportunities to remind the HCW to sanitize, and to collect hand hygiene opportunity data. Combined with the usage data, matching opportunity to compliance provides powerful incentives to compliance.

Dispenser system components include: micro-switch, audio amplifier, timer circuit, logic circuit, volume control (potentiometer or software controlled), on/off switch (switch or software controlled), dip switch (software controlled), and speaker. When a dispenser pump plunger or other actuator is pressed to express the sanitizer the switch is depressed, and the circuit generates an audible cue, e.g., a "pssss" sound. The timer is then reset, and the timer begins to count down. When/if the timer times out before the unit is again used, the circuit generates the "pssss" sound and the process repeats. The dispenser will continue to generate the reminder sound until the dispenser is used or is turned off. If the dispenser is not used after a short time, e.g., 3 minutes, the "pssss" sound is generated. The volume and time interval are programmable, and may be set from a dip switch or set from a computer. A microswitch is in the dispenser. The circuit can be turned off using a switch or by holding down the dispenser cap for a brief period, e.g., 10 seconds. The duration of nonuse time-out (the duration between reminders when not used), can be adjusted under software control when in communications with the central computer or by using dip switch settings on the printed circuit board. The dispenser may include a micro-trigger, printed circuit board, battery, and connector in the cap. Each dispenser has a unique identifier in the circuit, delivers real-time data time/date stamp records, and includes an expert port and a battery.

A data acquisition computer stores and exports/data acquisition computer stores and exports time/date stamp records. Such a computer for receiving data from dispensers may include a workstation, performance and storage to current standards; current version of MS-Access or other database system; connection to dispensers via serial or other cable; a printer, and a data CD burner. Reports may include a header record, dispenser records, and time/date records generated each time a dispenser is used and summary reports and graphs by hour, shift, month, year, HCW, or ward unit.

Organizing record-keeping, scheduling, and other contact management type functionality to manage this unique hand hygiene program is new. The use of a personal, body-word hand hygiene dispenser with tracking electronics and an audio cue are also new. The comparison of usage data to preestablished usage data norms to identify nonadherence is also new. Using wireless technology to download adherence data from a personal sanitizer dispenser, and using radio or other technology to identify which workers entering or exiting a patient care zone are new.

BRIEF DESCRIPTION OF THE DRAWINGS

This invention can better be understood by reference to the drawings, provided for exemplary purposes, and in which:

FIG. 5 is a side elevation view, taken in cross-section on line A-A of FIG. 3.

FIG. 6 is an end elevation view of the dispenser of FIGS. 1-5, taken in cross-section on line C-C of FIG. 1

FIG. 7 is a detail view o the dispenser as shown in FIG. 6.

DETAILED DESCRIPTION OF A PREFERRED EMBODIMENT

Figures 1, 2:
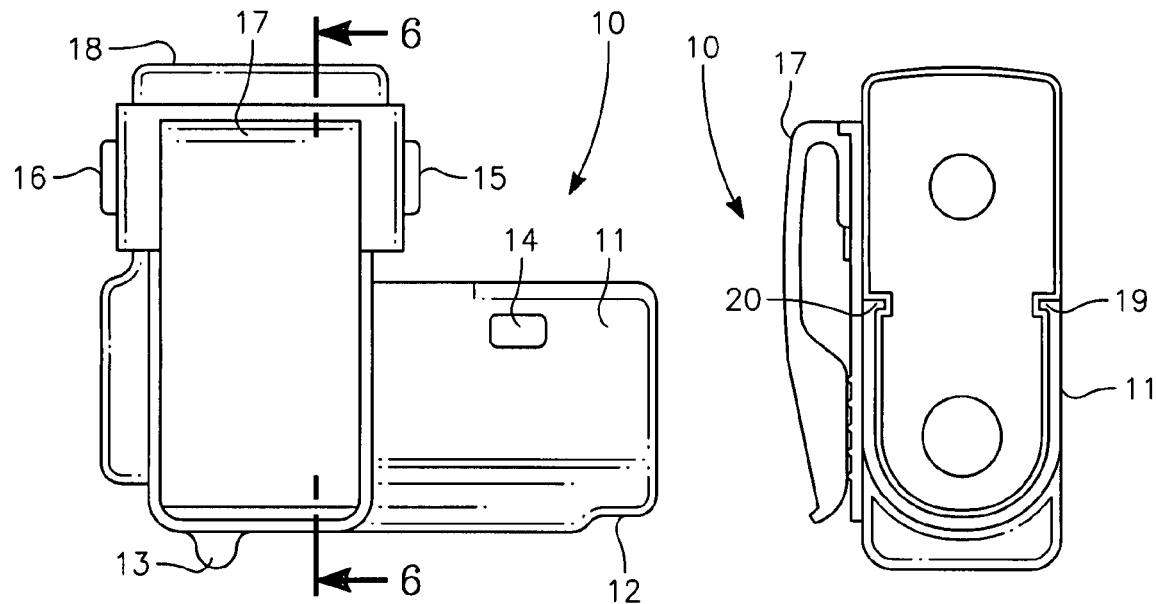
FIG. 1 is a side elevation view of an embodiment of a personal, hand-held dispenser with a horizontally-disposed, internal pump.
FIG. 2 is a side elevation view of the dispenser shown in FIG. 1, taken on line B-B of FIG. 1.
Figures 3, 4:
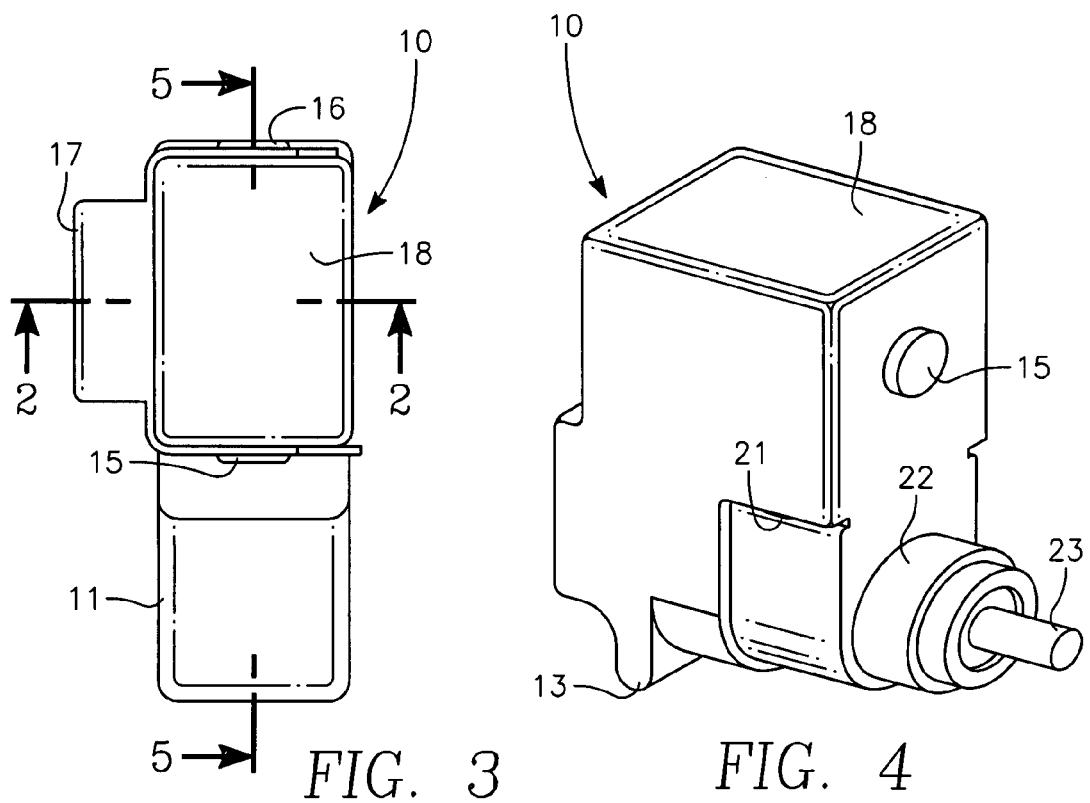
FIG. 3 is a top plan view of the dispenser shown in FIGS. 1 and 2.
FIG. 4 is a perspective view of the dispenser shown in FIGS. 1, 2 and 3.
Figures 8, 9:
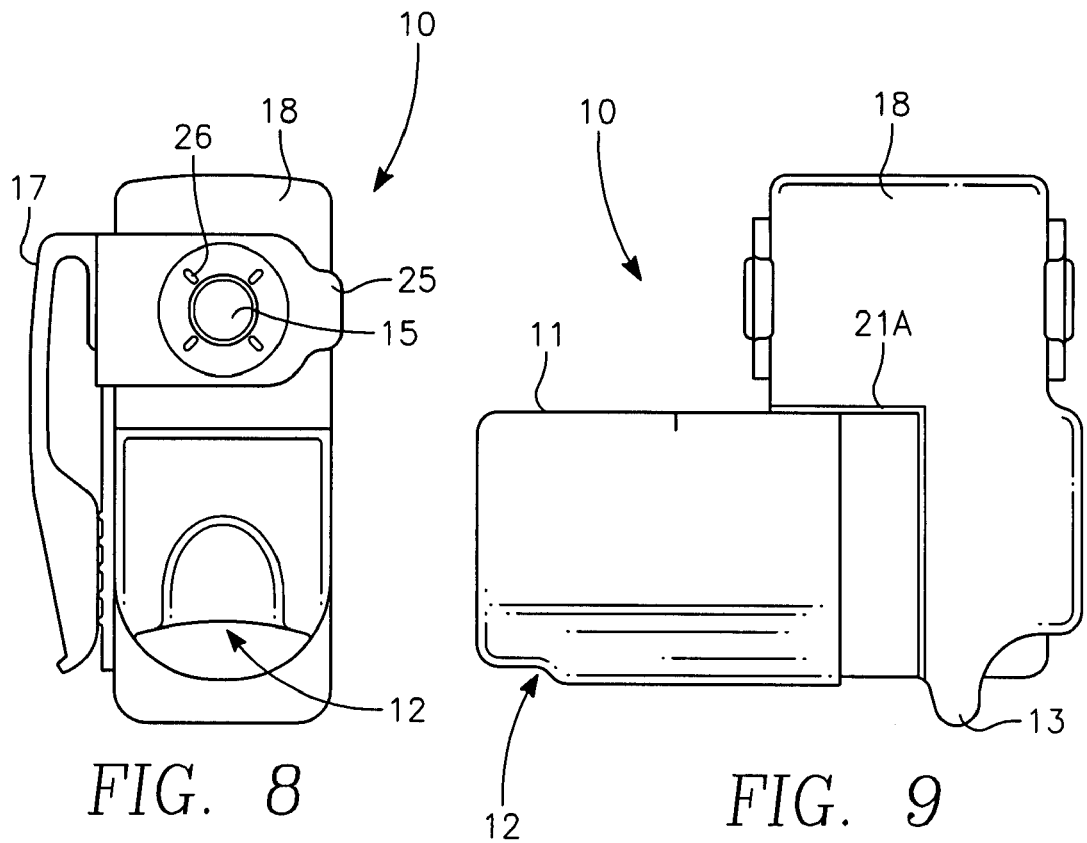
FIG. 8 is an end elevation view of the dispenser of FIGS. 1-7.
FIG. 9 is a side elevation view of the dispenser of FIGS. 1-8.
Figure 10:
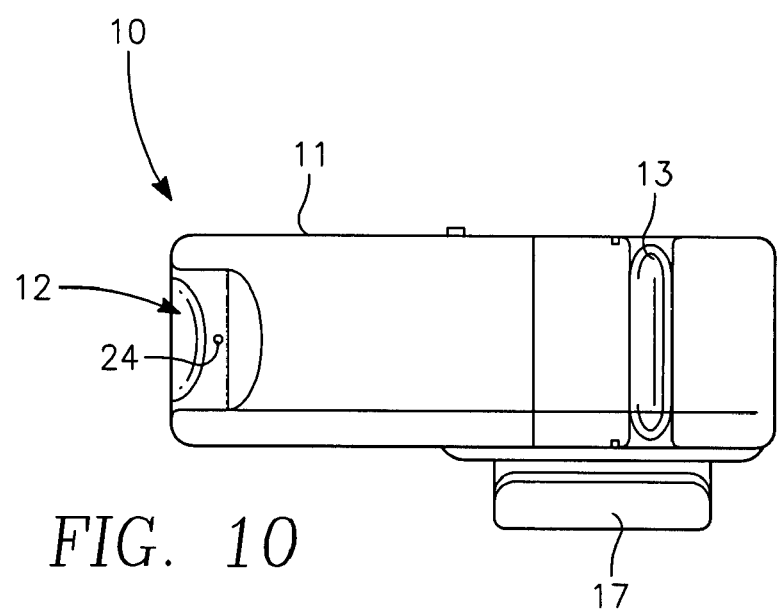
FIG. 10 is a bottom plan view of the dispenser of FIGS. 1-9.

The preferred embodiment of the invention is illustrated in the attached figures. FIGS. 1-10 show a hand-held, personal dispenser 10, including liquid reservoir 18, horizontally-disposed, internal pump 25, external clip 17, external finger hold 13, and liquid exit passage 24. Clip 17 is removable from dispenser 10. Clip 17 is attached to dispenser 10 by bendable flaps 25, which have flexible opening with flex joints 26 to snap fit over annular protrusions 15 and 16 on dispenser 10.

As best seen in FIGS. 2, 4, 6 and 9, cover 11 fits over pump 25, with flanges 19 and 20 on cover 11 fitting slidably into grooves 21 on reservoir 18, and with end recess 12 lying below pump plunger 23 and liquid exit passage 24. In use, dispenser 10 is held in the palm of a human hand, with the index finger curled around finger hold 13, and the end of cover 11 placed against the end of the palm nearest the wrist. Pulling the finger hold 1 toward the palm while pushing the cover 11 toward finger hold 13 depresses plunger 23, drawing liquid from reservoir 18 through pump 25, and then through passage 24 into the palm of the user. Cover 11 slides forward in grooves 21, with flanges 19 and 20 at the upper edges of cover 11, holding cover 11 in place over pump 25.

Figure 11A:
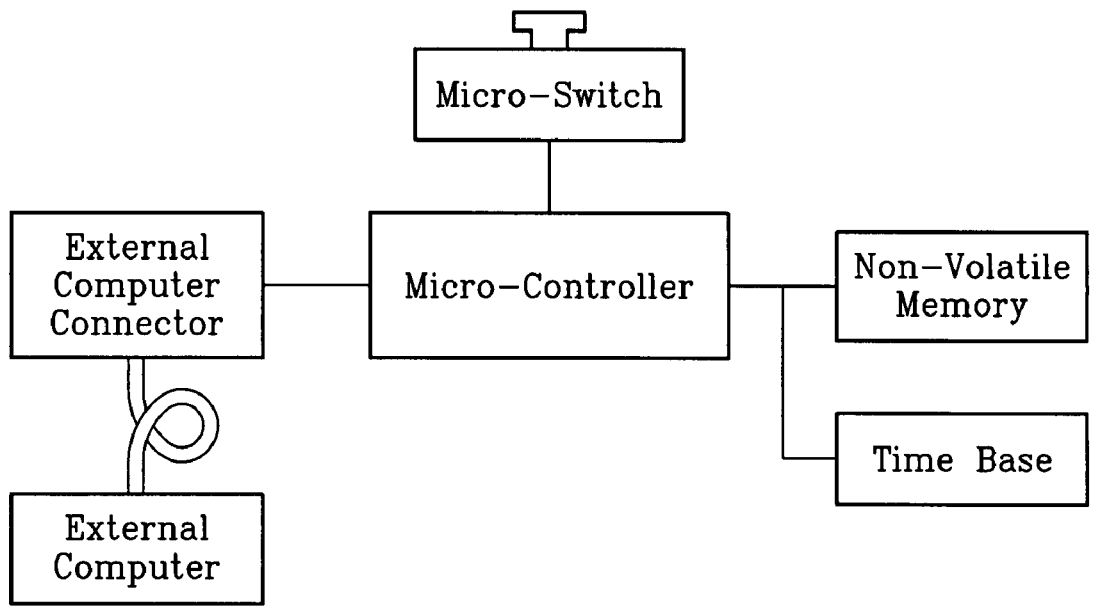
FIG. 11 is a block function diagram of a memory/computer circuit for use in detecting and recording data, such as the date and time of each use of a device such as the dispenser shown in FIGS. 1-10.
Figure 11B:
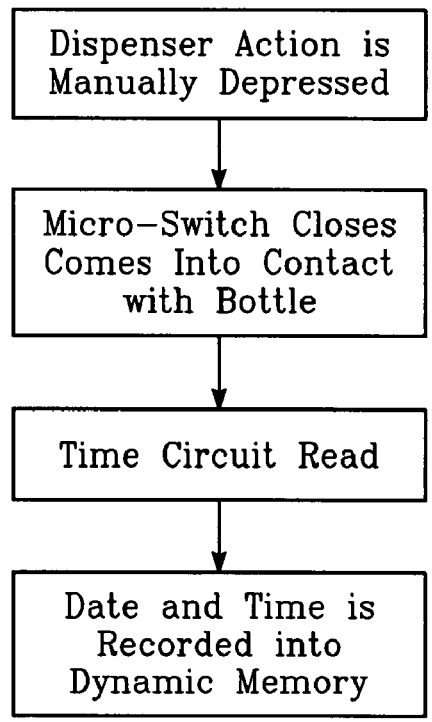

Inside cover 11 is an electrical circuit that includes a tiny switch that closes each time the plunger of pump 25 is depressed. Linked to this switch is a memory and a computer that work together to detect and record the date and time of each such event. A cable is connected to this circuit to pass the recorded information to a computer to track the frequency and time of each person's use of the dispenser for comparison to desired frequency and time of use. This circuit may also emit an audible prompt to remind a user to dispense liquid, such as a sanitizing fluid, at desired times. The computer/memory circuit may be useful in other devices, dispensers and otherwise, to detect and record other switch-controlled events that desirably take place at desired intervals. FIG. 11 is a block function diagram of an embodiment of a circuit of this kind.

Inside each dispenser is an electrical circuit that includes a tiny switch that closes each time the plunger of a dispenser pump is depressed. Linked to this switch is a memory and a computer that work together to detect and record the data and time of each such event. A cable is connected to this circuit to pass the recorded information to a computer to track the frequency and time of each person's use of the dispenser for comparison to desired frequency and time of use. This circuit may also emit an audible prompt to remind a user to dispense liquid, such as a sanitizing fluid, at desired times. The computer/memory circuit may be useful in other devices, dispensers or otherwise, to detect and record other switch-controlled events that desirably take place at desired intervals. FIG. 11 is a block function diagram of an embodiment of a circuit of this kind.

Figure 12:
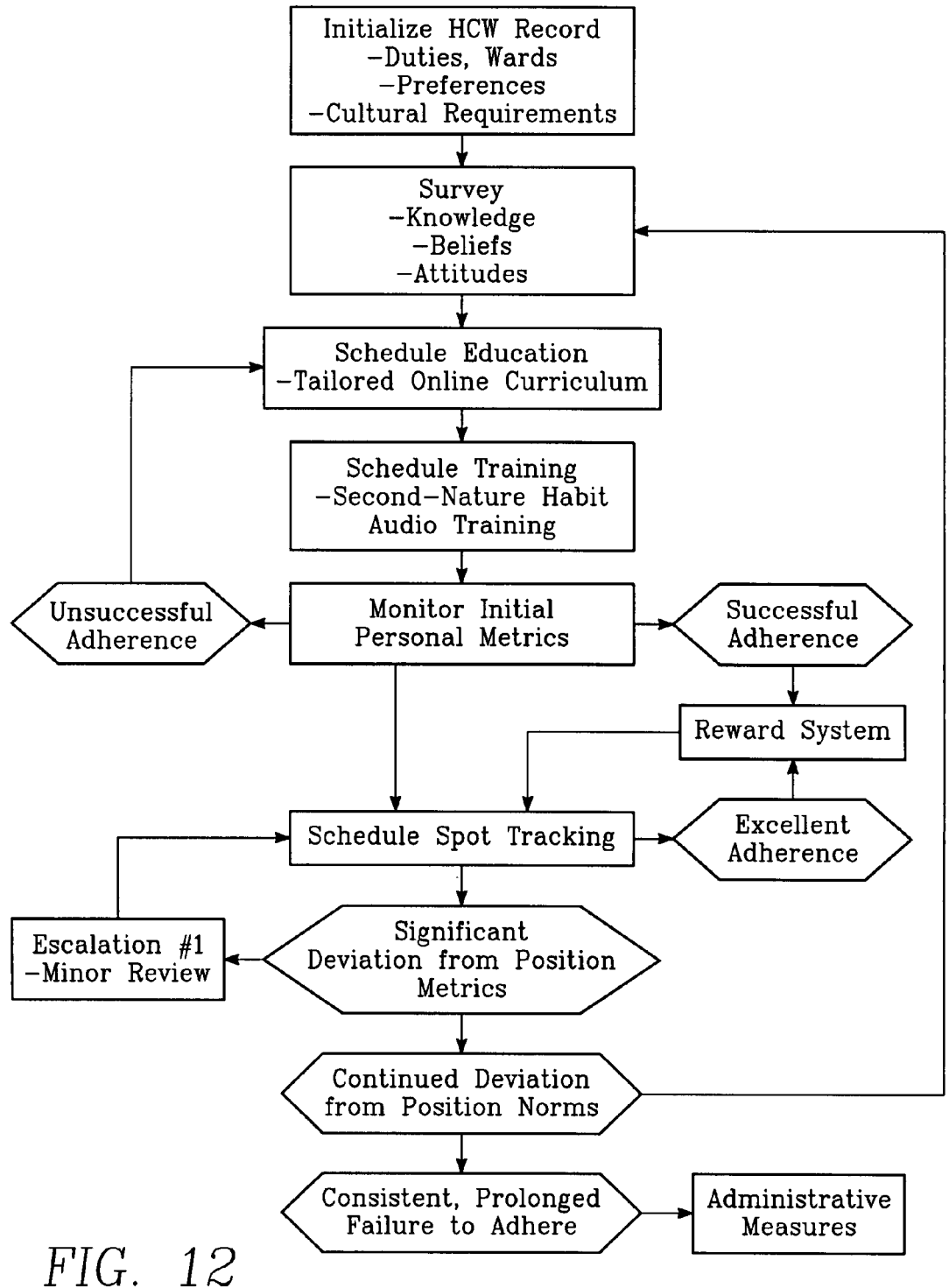
FIG. 12 is a flowchart showing an embodiment of the systems and methods for hand hygiene compliance management.

FIG. 12 shows a flowchart for an embodiment of the hand hygiene compliance management systems and methods. At the outset, the system records information about each HCW. After surveying each HCW's knowledge, beliefs and attitudes, the system schedules education and training in the use of the hand-held dispensers described in reference to FIG. 11.

The data downloaded from each dispenser is stored and assembled to monitor a user's dispenser usage. If the user's usage is below prescribed standards, re-education/training is prescribed. If the user's usage is successful or excellent, the user's performance may be rewarded.

The system schedules spot tracking of usage to assure continued adherence to desired usage, and rewards adherence, or refers the user to further teaching or further training or restore desired usage, if usage falls below desired levels. Deterrents discourage continued and/or consistent failure to adhere to desired usage standards.

Figure 13:
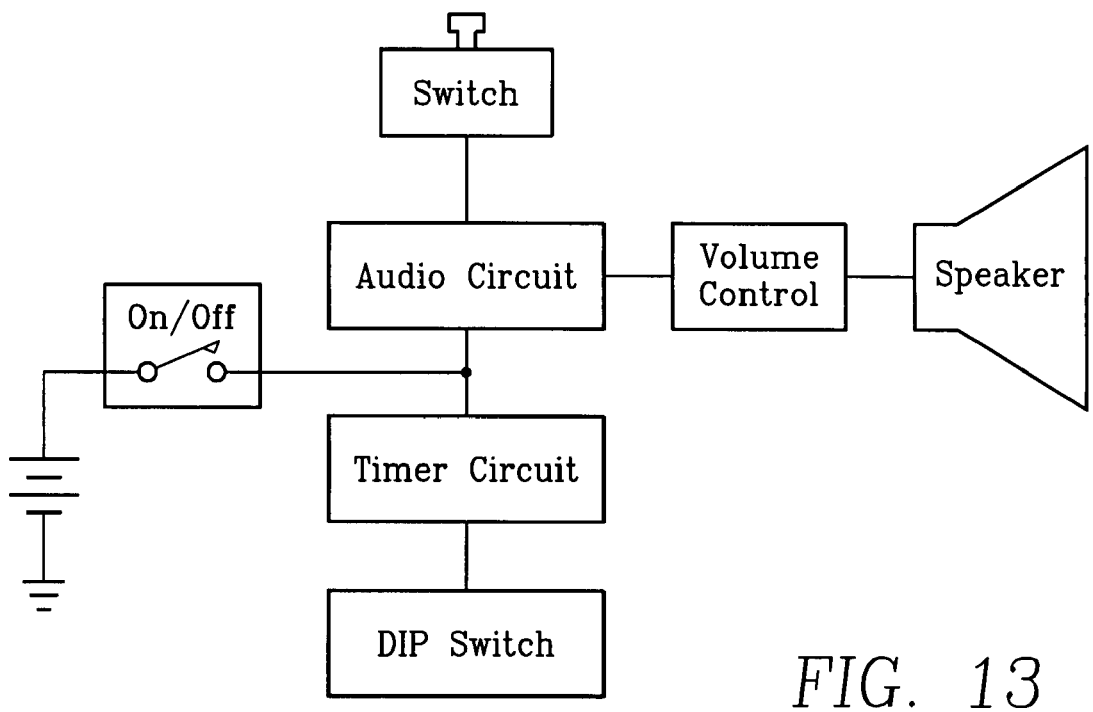
FIG. 13 is a block function diagram of an embodiment of the audio training circuit components for a dispenser useful in the methods and systems of hand hygiene compliance management.
Figure 14:
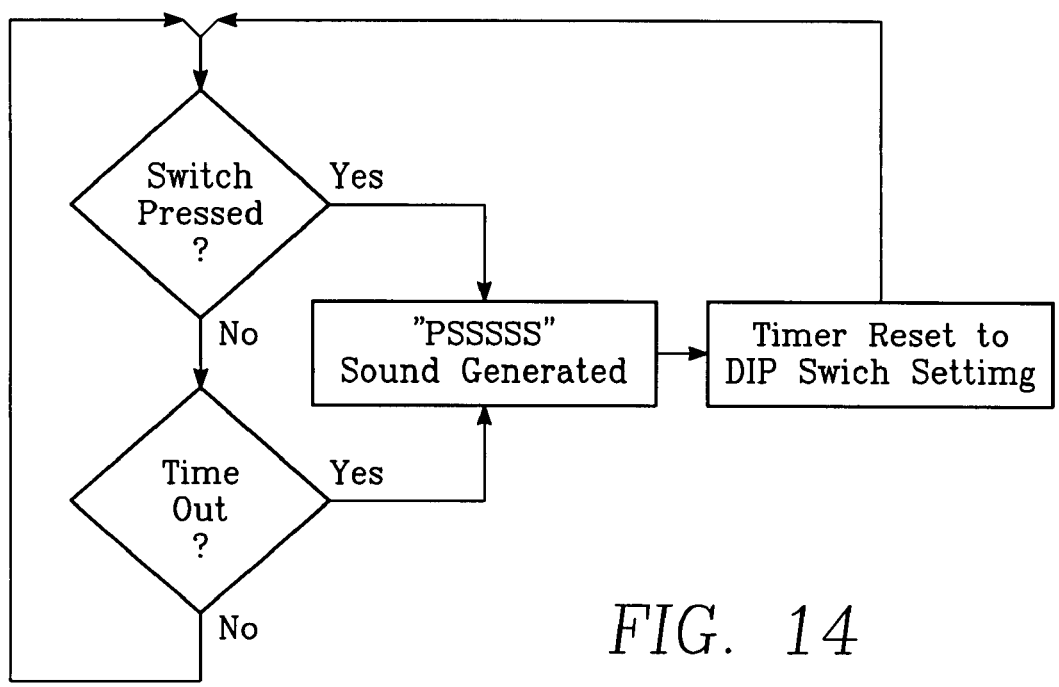
FIG. 14 is a circuit logic flow chart for the audio training circuit of FIG. 13.

FIGS. 13 and 14 show an embodiment of an audio training circuit in a dispenser. Timely dispenser usage turns off the audio circuit. Infrequent usage or non-usage triggers generation of an audible cue (e.g., the "pssss" sound) to prompt timely, consistent usage.

Figure 15:
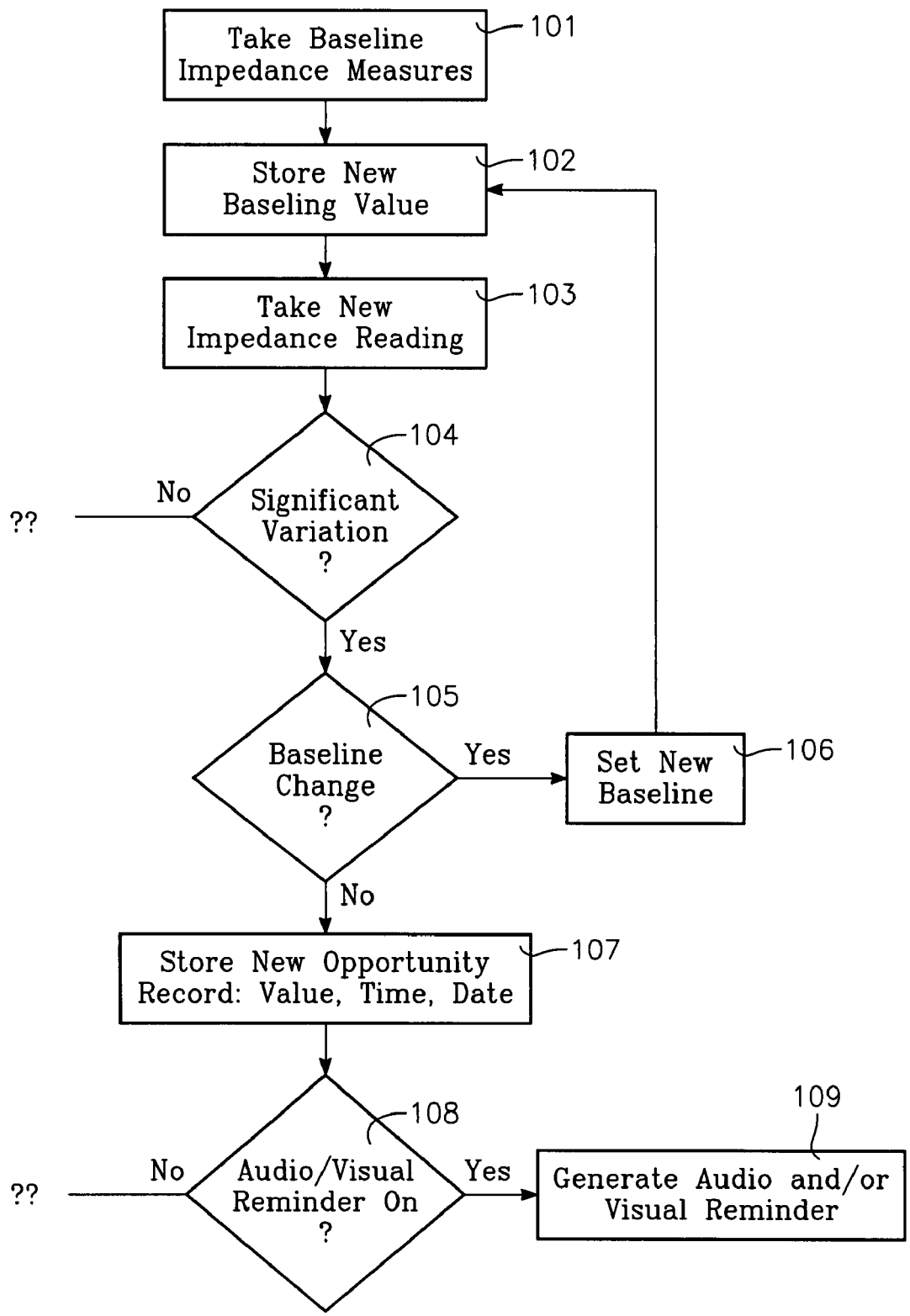
FIG. 15 is a flow diagram of a system for requesting, recording and transferring hand hygiene events from a trainer circuit in a personal dispenser to a computer.

FIG. 15 shows a flow diagram of a system for requesting, recording and transferring hand hygiene events from a trainer circuit in a personal dispenser to a computer. An exemplary RF protocol may be as follows: a computer sends out a polling signal at 101, a dispenser receives that signal and processes an interrupt at 102, the dispenser sends an acknowledging signal at 103, the computer asks for data download at 104, the dispenser sends the data download with a checksum at 105, the computer stores the data and verifies the checksum at 106/017, the computer sends a success code at 108, the dispenser receives the success code at 109 and resets its memory at 110.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. A system and method for training and monitoring of hygiene compliance comprising
    dispensing to a user a single-hand, body-worn personal solution dispenser for delivery of said solution into the human hand;
    electronic tracking of usage of said single-hand, body-worn personal dispenser;
    downloading compliance data from said dispenser to an external computer;
    providing audio behavior modification cues in an audio trainer circuit located inside of said dispenser; and
    wherein an audio trainer circuit is placed in said single-hand, body worn personal solution dispenser and programmed to provide an audio cue at pre-set intervals.

* * * * *